United States Patent
Abraham et al.

(10) Patent No.: US 7,849,113 B2
(45) Date of Patent: Dec. 7, 2010

(54) QUERY STATISTICS

(75) Inventors: Sundeep Abraham, Belmont, CA (US);
Wesley C. Lin, West Covina, CA (US);
Yasuhiro Matsuda, Palo Alto, CA (US);
Mohammad Faisal, Belmont, CA (US);
Geeta Arora, Union City, CA (US)

(73) Assignee: Oracle International Corp., Redwood Shores, CA (US)

( * ) Notice: Subject to any disclaimer, the term of this patent is extended or adjusted under 35 U.S.C. 154(b) by 458 days.

(21) Appl. No.: 11/978,799

(22) Filed: Oct. 30, 2007

(65) Prior Publication Data
US 2009/0112795 A1    Apr. 30, 2009

(51) Int. Cl.
*G06F 17/20* (2006.01)
*G06F 15/16* (2006.01)
(52) U.S. Cl. .................... 707/830; 707/688
(58) Field of Classification Search ........... 707/688, 707/830, 999.02
See application file for complete search history.

(56) References Cited

U.S. PATENT DOCUMENTS

| 2004/0133564 A1* | 7/2004 | Gross et al. .................. 707/3 |
| 2004/0205044 A1* | 10/2004 | Su et al. ...................... 707/2 |
| 2004/0243555 A1* | 12/2004 | Bolsius et al. ................ 707/3 |
| 2005/0027723 A1* | 2/2005 | Jones et al. ................ 707/100 |

* cited by examiner

*Primary Examiner*—Jean B. Fleurantin
*Assistant Examiner*—Alex Gofman
(74) *Attorney, Agent, or Firm*—Kraguljac & Kalnay, LLC

(57) ABSTRACT

Systems, methods, and other embodiments associated with selectively acquiring and utilizing query statistics are described. One example method includes selectively acquiring statistics associated with search queries submitted to a search process during a sample period. The statistics may be associated with an index and tokens associated with the index and search queries. The method may also include selecting tokens and/or queries to optimize based, at least in part, on the statistics. In one example, whether and/or how the tokens and/or queries are optimized may depend on estimating index fragmentation based, at least in part, on the statistics.

17 Claims, 10 Drawing Sheets

QUERY STATISTICS

BACKGROUND

A database may process a query that seeks out stored information. Searching a database for stored information may become inefficient as the quantity of stored information increases beyond certain levels. Thus, the information may be indexed in an attempt to improve search efficiency and response time. Conventional systems may index information using tokens that may appear in queries. However, as the index grows in size and/or becomes fragmented, searching for information may once again become inefficient and time consuming.

Thus, conventional systems may optimize a token(s) and/or index in an attempt to improve efficiency and response time. However, as the number of tokens increases it may become uneconomical to optimize all tokens. Similarly, as the size of the index grows, it may become uneconomical to optimize the entire index. Conventional systems may also de-fragment an index in an attempt to improve efficiency and response time. However, de-fragmenting an entire index may consume undesired amounts of system resources (e.g., memory, processor cycles). Conventional systems may even calculate index fragmentation data to decide whether to de-fragment an index. However, performing this calculation may also consume undesired amounts of system resources.

Having addressed the organization side (e.g., indexes) of query processing, some conventional systems may also optimize search requests in an attempt to further improve efficiency and response time. However, these conventional systems may optimize all search requests and/or a user-selected set of search requests, which once again may consume undesired amounts of system resources while producing only marginal performance gains on potentially irrelevant queries.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
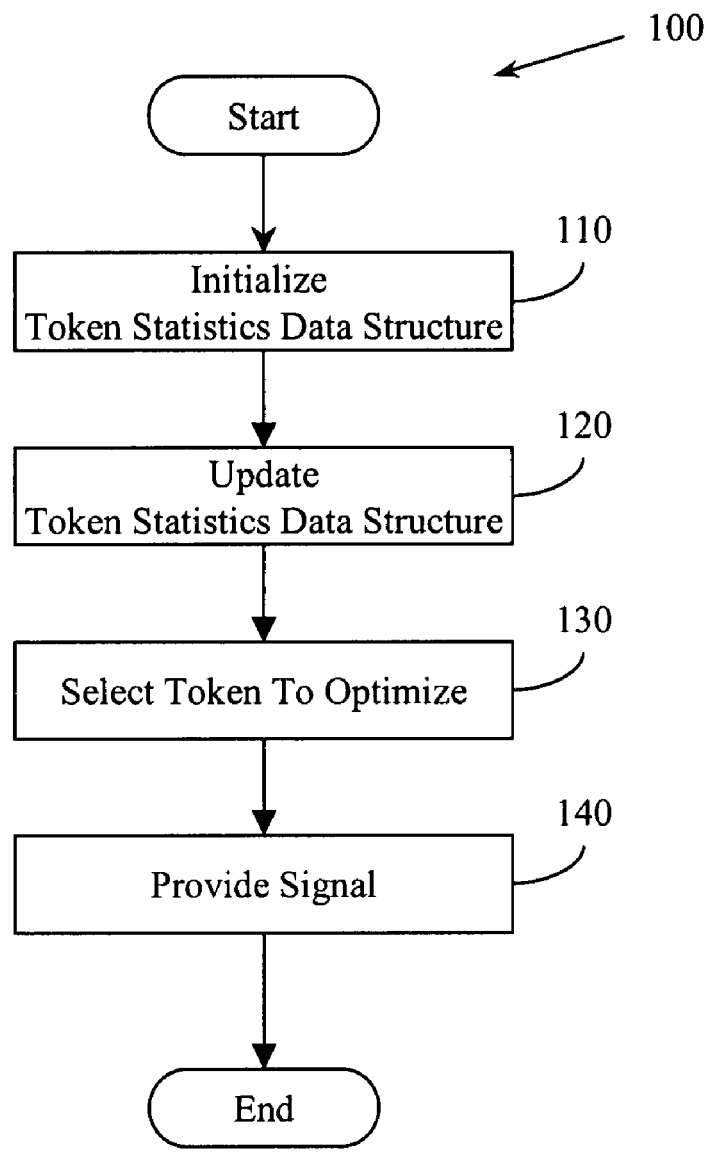
FIG. 1 illustrates an example method associated with query statistics.

A database may include a structured collection of data (e.g., records) stored in a memory. Selected portions of the data may be accessible through queries processed by a query processor. The queries may be designed to retrieve data based on specific criteria. An index may facilitate this retrieval.

Both a query and an index may be token-based. A token may be viewed as a categorized block of text that includes a meaningful, indivisible set of characters. A query may seek information associated with a set of tokens. An index may relate tokens to locations (e.g., files, database tables, web pages) where the tokens appear. Thus, from one point of view, an index may be treated as a data structure associated with lookup operations associated with query processing. This type of index may facilitate rapid random lookups in a database table(s). This type of index may also facilitate efficient ordering of record access. However, over time, the index may become fragmented as stored data is manipulated (e.g., added, deleted). This fragmentation may negatively impact lookup times. Therefore, example systems and methods facilitate selectively mitigating these negative impacts.

Data associated with some index entries (e.g., tokens) may be queried more frequently than others. Thus, negative impacts associated with token fragmentation and/or index fragmentation may be mitigated intelligently with less resource consumption than in conventional systems by selectively optimizing tokens associated with this frequently queried data. Therefore, example systems and methods facilitate identifying when and/or how to optimize an index and/or search requests that may interact with the index. By way of illustration, example systems and methods may facilitate identifying which tokens, if any, to optimize. Similarly, example systems and methods may also facilitate identifying which search queries, if any, to optimize. Additionally, example systems and methods may identify portions of a database index to optimize. Example systems and methods may also facilitate estimating index fragmentation, which can be used as a determining factor in deciding whether tokens, queries, and/or index portions are optimized. Rather than act on 100% of available tokens and/or queries, example systems and methods may intelligently select tokens and/or queries to optimize based on query information (e.g., statistics) acquired during a sampling period. Thus, in one example, optimizing and defragmenting may be tightly coupled where the tokens to optimize are identified, at least in part, by how fragmented they are.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, a CD (compact disk), other optical medium, a RAM (random access memory), a ROM (read only memory), a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, a discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., structured query language (SQL)), an object query language (OQL), a natural language, and so on.

"Software", as used herein, includes but is not limited to, one or more computer or processor instructions that can be read, interpreted, compiled, and/or executed and that cause a computer, processor, or other electronic device to perform functions, actions and/or behave in a desired manner. "Software" does not refer to stored instructions being claimed as stored instructions per se. The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with acquiring and utilizing query statistics. Method 100 may include, at 110, initializing a token statistics data structure. The token statistics data structure may store elements that hold data concerning tokens observed during a sample period. For example, the data may include information to identify a token. The identifier may be, for example, a text field, a string, and so on. In one example, the identifier may be the token value. Initializing the data structure may include removing token identifiers associated with previous sample periods. The data may also include information to identify a sample period query frequency associated with a token. In one example, this data may identify the number of times a token appears during a sample period. Rather than count the number of tokens in any individual query, example systems and methods may compute the overall observances of a token. In another example, this data may identify a rate at which a token is observed. The rate may concern occurrences per period of time, occurrences per number of queries, and so on. Initializing the data structure may include resetting token frequency values. The data may also include information to identify a fragmentation level associated with the token. The fragmentation level may describe the degree to which a token has become fragmented. Initializing the data structure may therefore include resetting fragmentation levels.

In one example, the token statistics data structure may be a list ordered by sample period query frequency. Thus, as tokens observed during the sample period are processed, entries may be added to the list. Memory is a finite resource. Also, processing long lists may require unacceptable amounts of system resources. Therefore, example methods may employ a finite sized list that grows to an upward limit as tokens are observed. In one example, the token statistics data structure may have a pre-determined, configurable number of elements. For example, the number of elements may be less than one thousand, may be limited to being less than one percent of the number of elements in the database index, and so on.

Method 100 may also include, at 120, updating the token statistics data structure. The data structure may be updated with information related to a set of tokens associated with a set of queries processed during a sample period by a query processor. The sample period may be, for example, a pre-defined period of time, a user-configurable period of time, a user-configurable number of queries, and so on. Updating the token statistics data structure may include adding an element to the token statistics data structure. The element may be added as a token is observed in a sample period. In one example, the data structure may be updated substantially contemporaneously with processing the token while in another example the data structure may be updated after the sample period has completed. Updating the token statistics data structure may also include removing an element from the token statistics data structure. For example, tokens having a low frequency and/or low fragmentation may be removed from the data structure as tokens having higher frequencies and/or fragmentations are observed. Updating the data structure may also include manipulating a sample period query frequency associated with a token. This may include, for example, establishing an initial value as a previously unobserved token is first observed, adding a value to a counter as a previously observed token is observed again, and so on. Updating the data structure may also include computing a fragmentation level associated with a token.

Method 100 may also include, at 130, selecting a token (or tokens) to optimize. Whether a token(s) is selected and which token is selected may be based, at least in part, on information in the token statistics data structure. In one example, the token selected may have a query frequency and fragmentation level falling within parameters that make it a candidate for optimization. For example, a token to optimize may be selected upon determining that a sample period query frequency associated with a member of the set of tokens exceeds a desired frequency level. The desired frequency level may be a discrete level (e.g., queried at least ten times), may be a relative level (e.g., in the highest ten percent of queried tokens), and so on. Similarly, a token to optimize may be selected upon determining that a fragmentation level associated with a member of the set of tokens exceeds a desired fragmentation level. In one example, the token to optimize may be selected based on a combination of fragmentation level and frequency.

Method 100 may also include, at 140, providing a signal concerning the token(s) selected. The signal may be communicated to a computer, stored in a memory, displayed, and so on. The signal may identify the token(s) and/or may control a logic to take an action related to the token(s).

Figure 2:
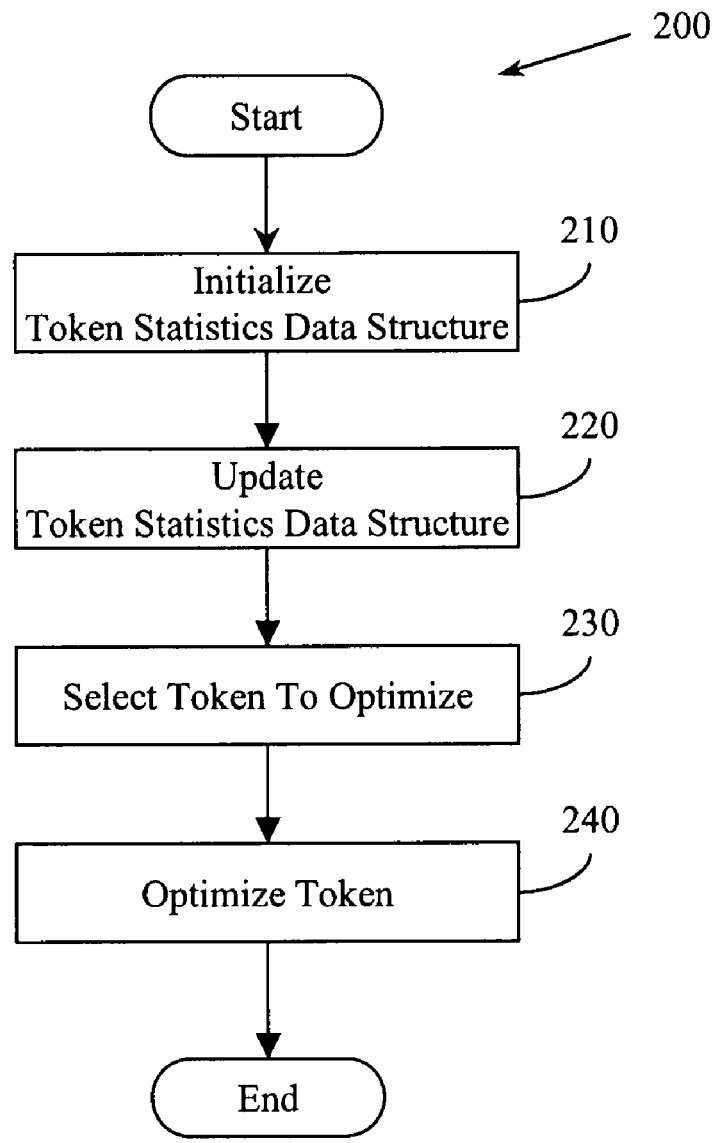
FIG. 2 illustrates another example method associated with query statistics.

FIG. 2 illustrates a method 200 associated with acquiring and utilizing query statistics. Method 200 includes some actions similar to those described in connection with method 100 (FIG. 1). For example, method 200 includes initializing a token statistics data structure at 210, updating the data structure at 220, and selecting a token to optimize at 230. However, method 200 includes a different action.

Method 200 includes, at 240, optimizing the token selected at 230. Which portion, if any, of the database index is to be selected may depend on token query frequency and/or token fragmentation. Thus, in one example, a token is to be selected at 230 upon determining that the value of a function based on both a sample period query frequency associated with a token and a fragmentation level associated with a token exceeds a desired level. The selected portion may then be optimized at 240.

Figure 3:
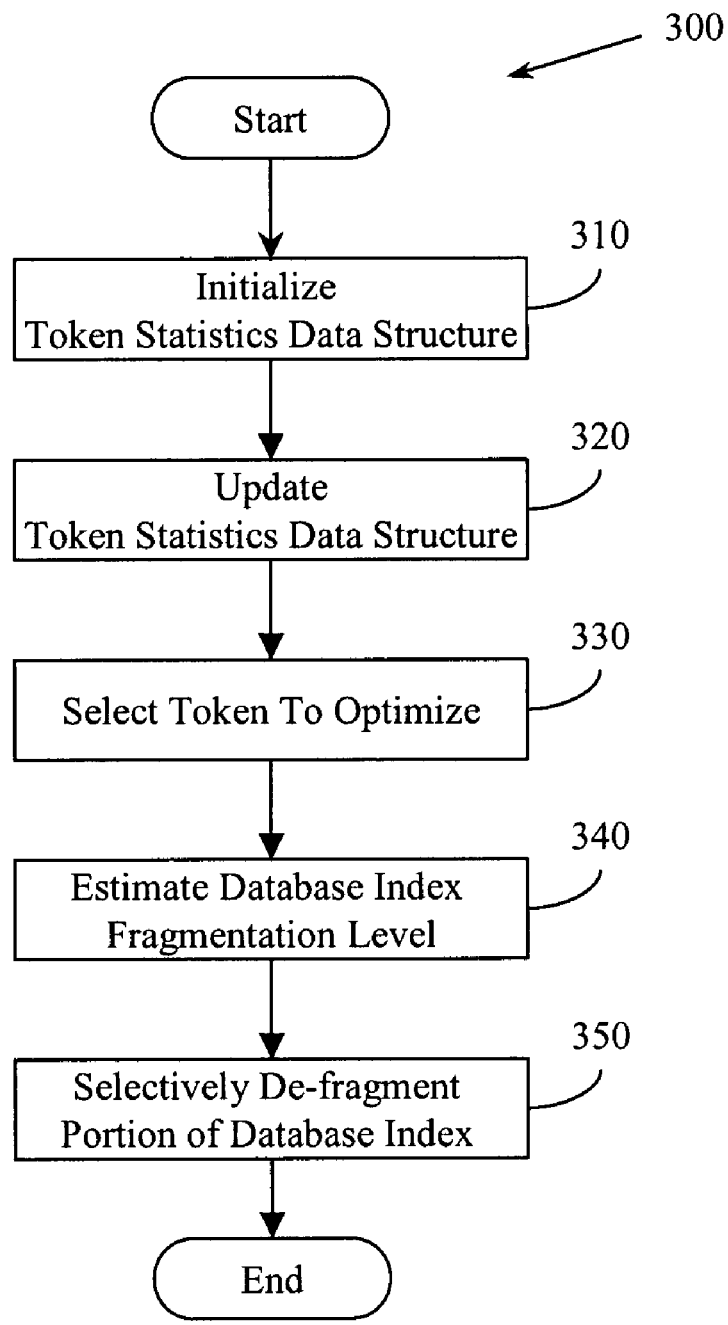
FIG. 3 illustrates another example method associated with query statistics.

FIG. 3 illustrates a method 300 associated with acquiring and utilizing query statistics. Method 300 includes some actions similar to those described in connection with method 200 (FIG. 2). For example, method 300 includes initializing a token statistics data structure at 310, updating the data structure at 320, and selecting a token to optimize at 330. However, method 300 includes two additional actions.

Method 300 includes, at 340, estimating a fragmentation level of the database index. The fragmentation level of the entire index may be estimated based, at least in part, on the fragmentation level of tokens observed during the sample period. In one example, the tokens upon which the fragmentation level estimation is made may be a set of tokens accessed most frequently during the sample period. In different examples the set may include a fixed number (e.g., 100) of the most frequently accessed tokens, a relative number (e.g., top 20%) of the most frequently accessed tokens, tokens whose access frequency lies above a threshold, and so on.

Having estimated a fragmentation level, method 300 may then, at 350, selectively de-fragment a portion of the database index. Whether the portion of the index is de-fragmented may depend, at least in part, on the estimated fragmentation level of the index. For example, if the estimated fragmentation level is less than a threshold, the portion of the index may not be de-fragmented. However, if the estimated fragmentation level is above the threshold, then the portion of the index may be de-fragmented. Additionally, which portion(s) of the index is de-fragmented may depend on the fragmentation levels associated with tokens involved in estimating the fragmentation level. For example, portions of the database index to de-fragment may be selected based on a relationship between access frequency and fragmentation level.

Figure 4:
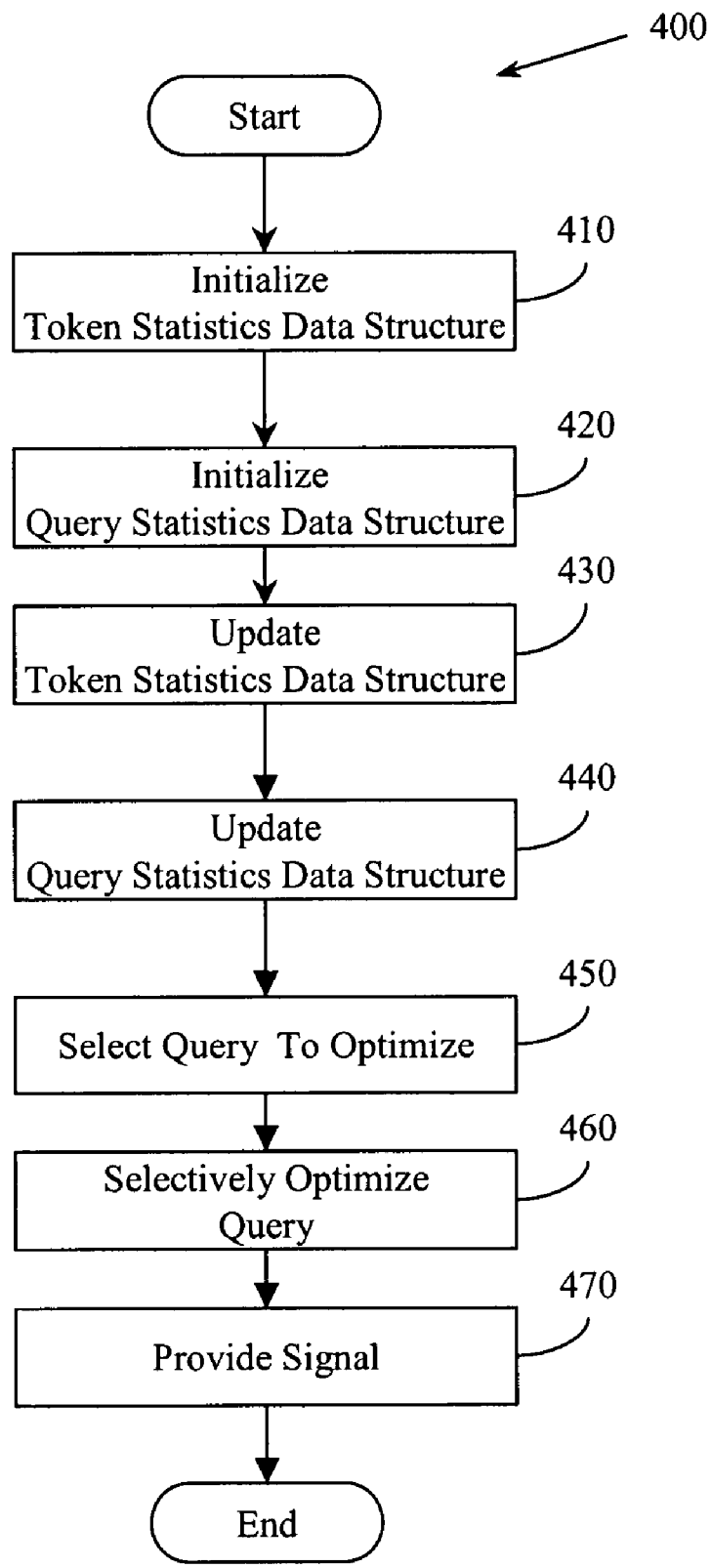
FIG. 4 illustrates another example method associated with query statistics.

FIG. 4 illustrates a method 400 associated with acquiring and utilizing query statistics. Method 400 includes some actions similar to those described in connection with method 100 (FIG. 1). For example, method 400 includes initializing a token statistics data structure at 410, updating the token statistics data structure at 430, and providing a signal at 470. However, method 400 includes additional actions.

Method 400 includes, at 420, initializing a query statistics data structure. While the token statistics data structure may store information related to individual tokens observed during a sample period, the query statistics data structure may store information related to queries observed during a sample period. Thus, the query statistics data structure may store elements having an entry to identify a query and an entry to identify a query processing time associated with the query. In different examples the query processing time may be a wall clock time, a processor cycle time, and so on. The query statistics facilitate identifying which, if any, queries to optimize. Rather than optimizing a user selected set of queries, method 400 facilitates identifying queries that actually take a long time to process and then selectively optimizing some of those queries. Thus, system resources may be spent on optimizing queries that are likely to provide a good return on investment in terms of reducing query processing time based on actually observed actions.

In one example, the query statistics data structure may have N elements, N being a pre-determined, configurable number of elements. In one example, N may be a discrete number (e.g., three hundred). In another example N may be related to the number of queries observed during the sample period. For example, N may be limited to be less than ten percent of the number of different queries observed during the sample period. In one example, the query statistics data structure may be a list. The list may store the queries having the longest query processing times observed during the sample period. In one example, the list may be ordered by query processing time.

Method 400 also includes, at 440, updating the query statistics data structure with information related to the set of queries processed during the sample period. Updating the query statistics data structure may include adding an element to the query statistics data structure and/or removing an element from the query statistics data structure. For example, the query statistics data structure may initially be empty and may have elements (e.g., records) added as previously unobserved queries are processed. Over time, the query statistics data structure may fill. Thus, when a query is observed to have a processing time longer than the processing time of an entry in the query statistics data structure, then the entry associated with the quickest query in the data structure may be removed and an entry associated with the newly observed query may be added. In one example, the data structure may then be re-ordered. In this way, the query statistics data structure can have a small, finite size and may store information concerning the N slowest queries observed during a sample period. When the data structure takes certain forms (e.g., linked list), re-ordering may be accomplished automatically when the new entry is inserted.

Method 400 also includes, at 450, selecting a query to optimize based, at least in part, on information in the query statistics data structure. In one example, a query may be selected to be optimized upon determining that the query has one of the longest query processing times as compared to other queries observed during the sample period. In another example, a query may be selected to be optimized upon determining that its processing time exceeds a desired threshold. Thus, the selection and comparison may be discrete and/or relative. For example, the slowest ten percent of the observed queries may be optimized, the slowest fifty queries may be optimized, queries whose processing time exceeds a pre-defined threshold may be optimized, and so on.

Method 400 also includes, at 460, optimizing the selected query. Optimizing a query at 460 may include different actions. In one example, optimizing a query may include de-fragmenting a portion of an index associated with a token in the query. In another example, optimizing a query may include rewriting the query. Method 400 may, at 470, provide a signal concerning the token and/or query identified and/or processed. In one example, query statistics and token statistics are independently computed. Thus, while FIG. 4 illustrates query statistics and token statistics computations interleaved, it is to be appreciated that the statistics may, in different examples, be computed individually and/or in parallel.

Figure 5:
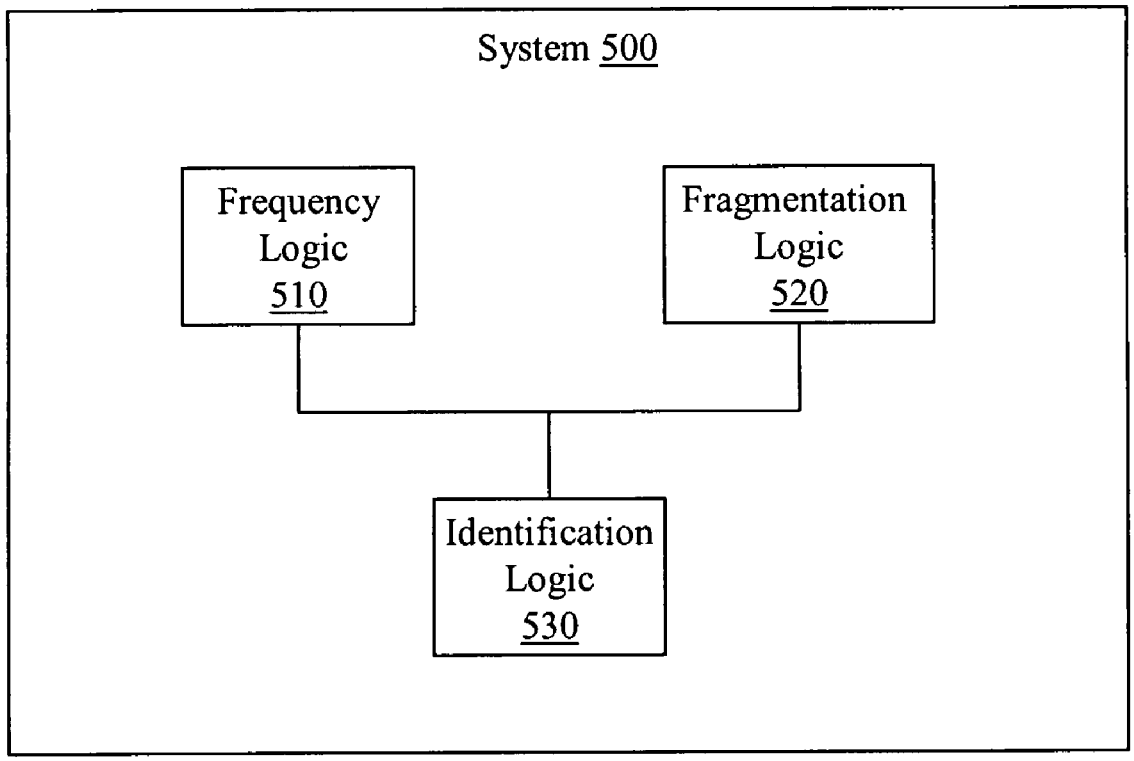
FIG. 5 illustrates an example system associated with query statistics.

FIG. 5 illustrates a system 500 that acquires and utilizes token-based query statistics. System 500 includes a frequency logic 510 to identify tokens observed most frequently during a query sampling time period. The query sampling time period is a period of time during which statistics associated with tokens and queries presented to a query processing system are acquired. Frequency logic 510 may receive information concerning the queries in real-time as they are processed during the query sampling time period (e.g., on-the-fly) and/or may receive information concerning the queries after the query sampling time period is over (e.g., batch). Frequency logic 510 may estimate which tokens appear most frequently during a query sampling time period. In one example, rather than keep an exact count for each available and/or observed token, frequency logic 510 may determine access rates for a finite number of tokens. Frequency logic 510 may then continue to acquire and record data for tokens considered to be frequently accessed. Thus, incomplete yet useful data may be acquired in a timely fashion without consuming unacceptable amounts of system resources. Access frequency can then be estimated from this data. Optimization decisions may then be based, at least in part, on estimated access frequency.

System 500 may also include a fragmentation logic 520 to estimate a fragmentation associated with a token. The fragmentation may describe, for example, the degree to which an index page associated with a token has become fragmented. Excessive fragmentation may negatively impact lookups that access the fragmented page. Once again, rather than acquire and store complete and/or exact fragmentation information, fragmentation logic 520 may acquire estimated and/or incomplete yet still useful data. In one example, to minimize fragmentation processing, this data may be acquired after frequency related processing has completed. This may be the case when a system is frequency biased. In another example, to minimize frequency processing, fragmentation data may be acquired before and/or contemporaneously with frequency data. This may be the case when a system is fragmentation biased.

System 500 may also include an identification logic 530 to identify a token to optimize. Which token(s) is to be optimized may depend, at least in part, on token access frequencies and/or on token fragmentation values. In one example, the identification logic 530 will identify tokens to optimize based on access frequency. For example, the most frequently accessed token may be selected, a finite number (e.g., twenty five) of most frequently accessed tokens may be selected, a percentage (e.g., top ten percent) of the most frequently accessed tokens may be selected, tokens having a frequency above a pre-defined threshold may be identified, and so on. In one example, the identification logic 530 will identify tokens based on fragmentation levels. For example, the most fragmented token may be selected, a finite number (e.g., ten) of the most fragmented tokens may be selected, a percentage (e.g., top half) of the most fragmented tokens may be selected, tokens having a fragmentation above a pre-defined threshold may be identified, and so on.

In another example, the identification logic 530 may decide to optimize a token and/or a portion of the database index associated with the token based on a function of two variables (e.g., token access frequency, token fragmentation). In different examples the function may be biased more towards frequency or fragmentation. In one example, the weighting may be dynamically configurable and/or user configurable. For example, during processing it may be noted that frequency distribution is negligible while fragmentation distribution is pronounced, meaning there is very little difference between token access frequencies but there is great difference between token fragmentation. Thus, the function may be weighted more towards fragmentation. In one example the re-weighting may performed manually while in another example the re-weighting may be performed automatically by the identification logic 530.

In one example, the frequency logic 510 and the fragmentation logic 520 may store token-related data in a data store. This token-related data may concern tokens observed during the sampling time period. The data store may be dynamically resizable during the sampling time period. To conserve system resources, the maximum size of the data store may be less than that required to store information concerning a complete set of tokens. In one example, the data store may be less than one percent of the size of a database index associated with the set of tokens. In another example, the data store may have a fixed maximum number of entries (e.g., 300). In one example, the data store may be ordered by token access frequency and/or token fragmentation. Storing token-related data in a data store may also facilitate combining information from various processes, for example.

Figure 6:
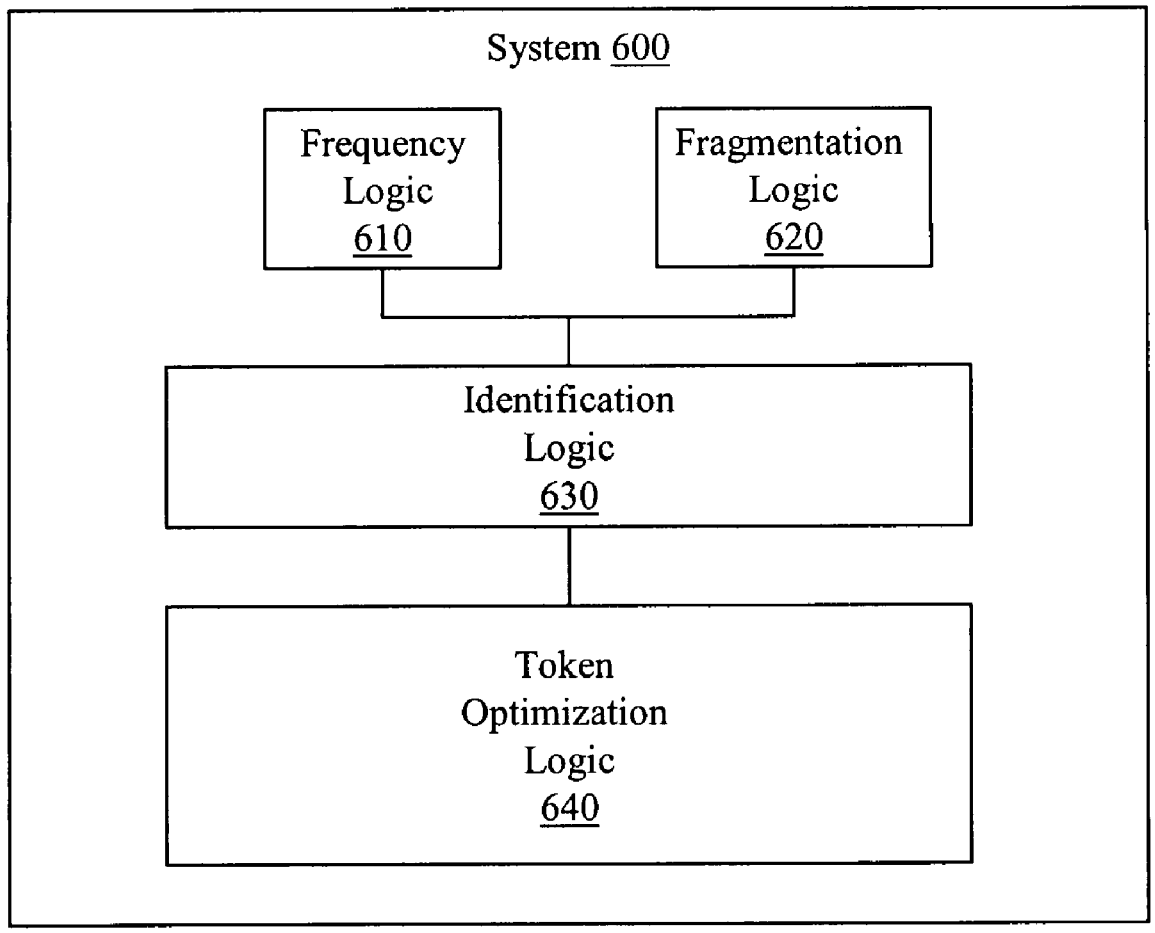
FIG. 6 illustrates another example system associated with query statistics.

FIG. 6 illustrates a system 600 that includes some elements similar to those described in connection with system 500 (FIG. 5). For example, system 600 includes a frequency logic 610, a fragmentation logic 620, and an identification logic 630. However, system 600 includes an additional logic.

System 600 includes a token optimization logic 640 to optimize a token. The token to optimize may be selected by identification logic 630 based on information provided by frequency logic 610 and/or fragmentation logic 620. In one example, token optimization logic 640 may relocate a memory page associated with the token to optimize the token. Relocating the memory page from a relatively slower device (e.g., remote server) to a relatively faster device (e.g., local server cache memory) may improve response time by reducing network traffic. In another example, token optimization logic 640 may optimize a token by de-fragmenting a memory page associated with the token.

Figure 7:
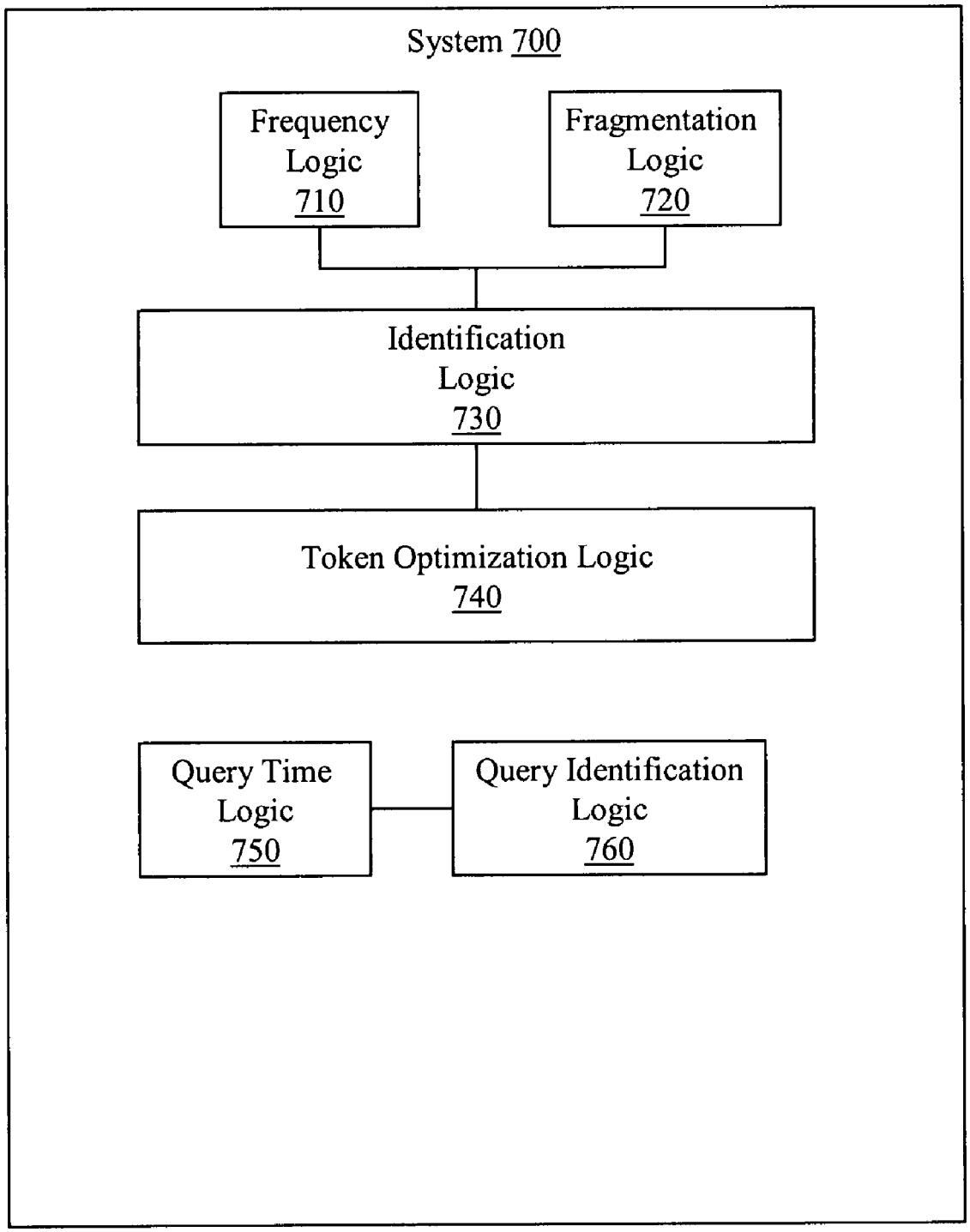
FIG. 7 illustrates another example system associated with query statistics.

FIG. 7 illustrates a system 700 that includes some elements similar to those described in connection with system 600 (FIG. 6). For example, system 700 includes a frequency logic 710, a fragmentation logic 720, an identification logic 730, and a token optimization logic 740. However, system 700 includes additional logics.

System 700 includes a query time logic 750 and a query identification logic 760. Query time logic 750 identifies queries that consume the most processing time during the query sampling time period. In one example, query time logic 750 may estimate which queries consume the most processing time. In another example, query time logic 750 may selectively add and/or remove entries identifying queries and their related processing times from a list data structure. The list may be ordered on processing time and may store, for example, information concerning the two hundred slowest queries. While a two hundred entry ordered list is described, it is to be appreciated that other data structures having different sizes and organizations may be employed.

Consider the following example. Initially the query time logic 750 will have an empty data structure to populate. By definition the first query processed will be the slowest query. The second query will also by definition be amongst the N slowest queries, N being the size of the data structure. Until at least N queries have been processed, query time logic 750 can simply add queries to the data structure and keep track of the fastest query process time. After the data structure is full, the query time logic 750 may then need to determine whether to remove an entry to make way for an entry associated with a query having a slower processing time. In one example, query time logic 750 may keep the data structure in order so that the "last" entry can be removed and the new entry can be inserted at a proper location. A linked list is one example of a data structure that facilitates this type of removal and ordered insertion. While a linked list is described, it is to be appreciated that more complicated logic and data structures may be involved to update on-disk data. For example, on-disk data may be loaded and integrated with in-memory data. The combined data may then be processed to find candidate queries.

Query identification logic 760 may identify (e.g., select) a query to optimize. A query may be selected based, at least in part, on query processing time. In one example, relative processing times may be examined to identify queries to optimize. For example, the ten slowest queries may be processed. In another example, queries whose processing time exceeds a limit may be selected to optimize. In one example, the limit may be established as a percentage of the slowest query, as an average of the M slowest queries (M being a number), as an absolute value, as an absolute user-configurable value, and so on. In some cases, the slowest query may not be optimized. Consider the situation where the slowest query is observed once during a query sample period but the second slowest query is observed one hundred times during the query sample period. A greater reduction in overall query processing time may be achieved by optimizing the second slowest query, even though it is quicker than the slowest query.

The query identification logic 760 may select a query to optimize based on processing time, query frequency, and/or token frequency. For example, a query that includes frequently accessed tokens having high fragmentation levels may be selected for optimization. In this case, optimizing the query may include optimizing the tokens. In one example, a query may be selected based on query processing time and token information (e.g., token access frequency, token fragmentation).

Figure 8:
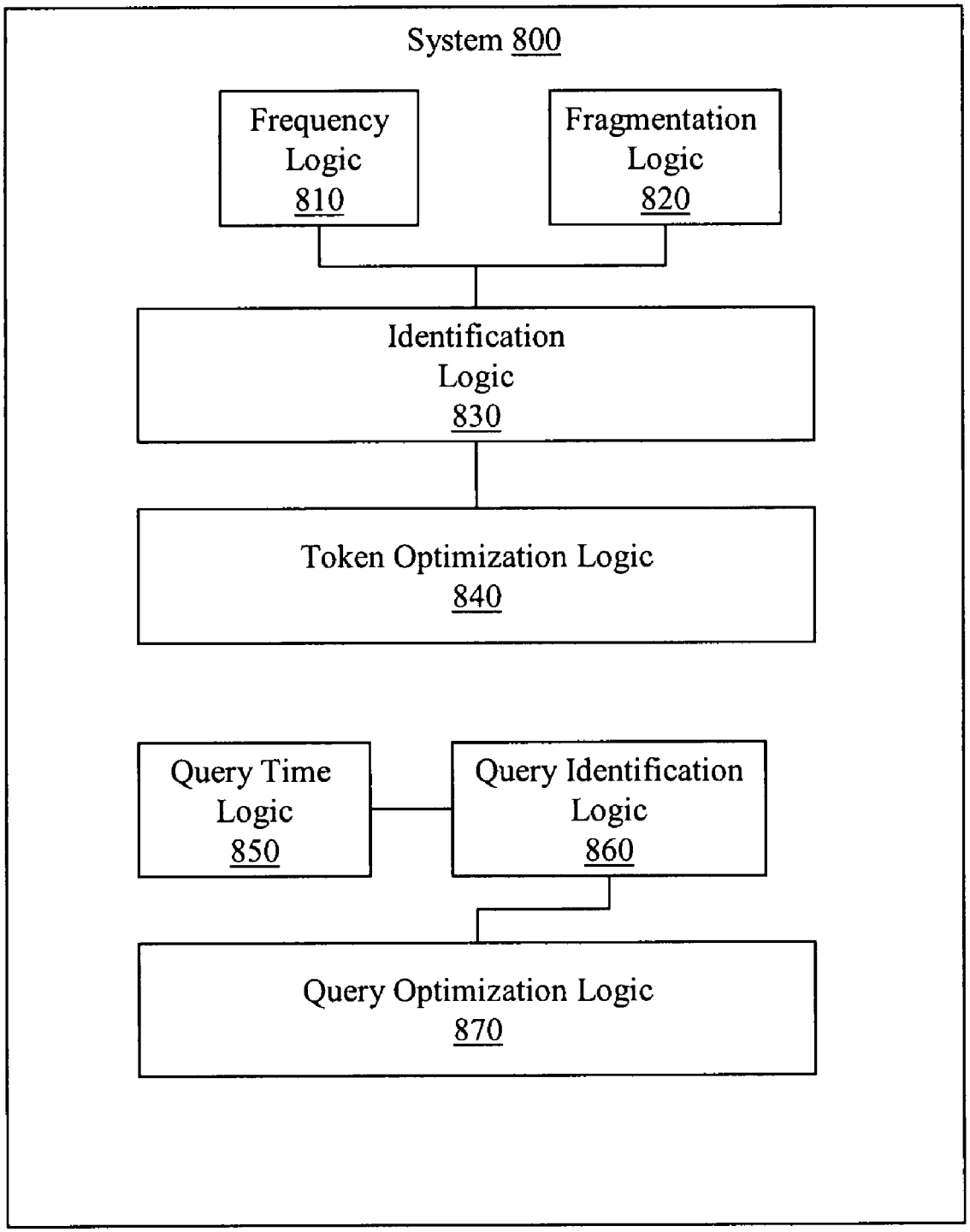
FIG. 8 illustrates another example system associated with query statistics.

FIG. 8 illustrates a system 800 that includes some elements similar to those described in connection with system 700 (FIG. 7). For example, system 800 includes a frequency logic 810, a fragmentation logic 820, an identification logic 830, a token optimization logic 840, a query time logic 850, and a query identification logic 860. However, system 800 includes an additional logic.

System 800 includes a query optimization logic 870. Query optimization logic 870 may optimize a query identified by query identification logic 860 based on information provided by query time logic 850. In one example, query optimization logic 870 may optimize a query by creating a materialized view from which the query can be satisfied. In another example, query optimization logic 870 may optimize a query by relocating data associated with satisfying the query. By way of illustration, data to satisfy the query may be distributed between a set of storage devices. Relocating the data may include collecting the data into a single, readily accessed location. By way of further illustration, data to satisfy the query may be stored in a relatively slower storage device (e.g., tape drive). Relocating the data may therefore include moving the data to a relatively faster storage device (e.g., memory). Query optimization logic 870 may, additionally and/or alternatively, de-fragment a memory page(s) associated with satisfying the selected query.

Figure 9:
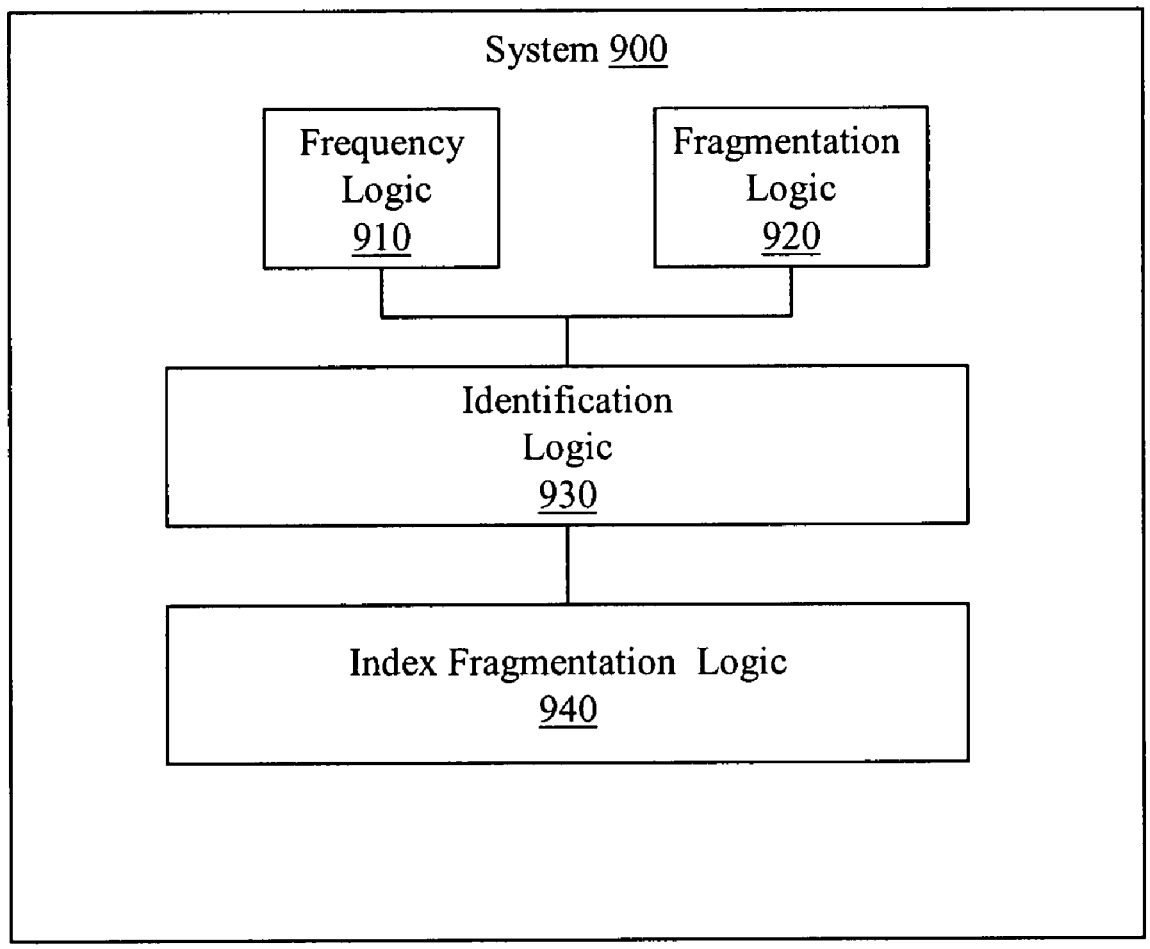
FIG. 9 illustrates another example system associated with query statistics.

FIG. 9 illustrates a system 900 that includes some elements similar to those described in connection with system 500 (FIG. 5). For example, system 900 includes a frequency logic 910, a fragmentation logic 920, and an identification logic 930. However, system 900 includes an additional logic.

System 900 includes an index fragmentation logic 940. Index fragmentation logic 940 may estimate a database index fragmentation level. The estimation may be based, at least in part, on the estimated fragmentation level of tokens observed during a query sample period. Index fragmentation logic 940 may not compute an index fragmentation level by examining all and/or substantially all of the fragmentation levels associated with all the tokens related to the index. Instead, index fragmentation logic 940 may examine fragmentation levels of tokens that are actually observed during a query sample period. Thus, an index fragmentation level that is related to queries and tokens actually being processed may be computed. This fragmentation level may be more relevant to actual operating conditions and thus may be more relevant to decisions concerning whether to de-fragment a portion of a database index. In one example, index fragmentation logic 940 may provide a signal to control whether a portion of an index is de-fragmented. In another example, index fragmentation logic 940 may provide a signal identifying a portion of an index to de-fragment. The portion may be selected based, at least in part, on an overall estimated fragmentation level and its relation to the fragmentation level of a token and/or set of tokens.

Figure 10:
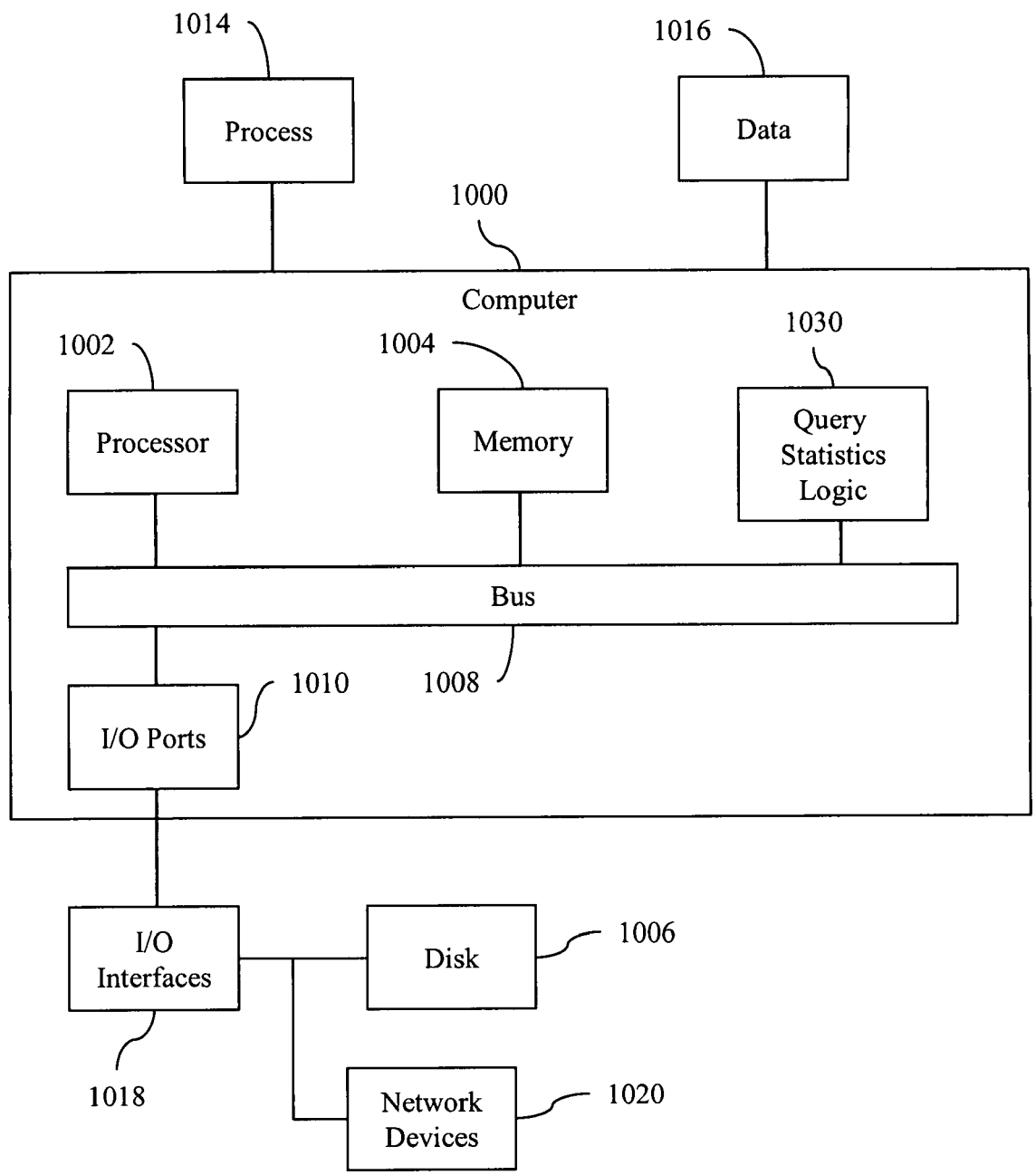
FIG. 10 illustrates another example system associated with query statistics.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a query statistics logic 1030 configured to facilitate acquiring query statistics and taking actions based on the collected statistics. In different examples, the logic 1030 may be implemented in hardware, software, firmware, and/or combinations thereof. Thus, logic 1030 may provide means (e.g., hardware, software, firmware) for acquiring frequency information for a set of tokens observed during a query sample period. The set of tokens may be associated with a set of queries processed during the query sample period. While the logic 1030 is illustrated as a hardware component attached to the bus 1008, it is to be appreciated that in one example, the logic 1030 could be implemented in the processor 1002.

Logic 1030 may also provide means (e.g., hardware, software, firmware) for acquiring fragmentation information for tokens observed during a sample period. The fragmentation information may describe, for example, the degree to which a memory page(s) associated with the token is fragmented. Logic 1030 may also provide means (e.g., hardware, software, firmware) for acquiring processing time information for queries. The processing time information may be used, for example, to identify a query to optimize. The processing time information may be, in different examples, a clock time, an instruction count, an i/o count, and so on. Logic 1030 may also provide means (e.g., hardware, software, firmware) for identifying a token to optimize. Whether a token is optimized may depend, at least in part, on frequency information and/or fragmentation information. Logic 1030 may also provide means (e.g., hardware, software, firmware) for identifying a query to optimize. Whether a query is optimized may depend, at least in part, on processing time information and/or on token related information (e.g., token access frequency, token fragmentation).

Generally describing an example configuration of the computer 1000, the processor 1002 may be a variety of various processors including dual microprocessor and other multiprocessor architectures. A memory 1004 may include volatile memory and/or non-volatile memory. Non-volatile memory may include, for example, ROM (Read Only Memory), PROM (Programmable ROM), and so on. Volatile memory may include, for example, RAM (Random Access Memory), synchronous RAM (SRAM), dynamic RAM (DRAM), and so on. The memory 1004 may store, for example, a token to optimize, information concerning a token to optimize, a query to optimize, information concerning a query to optimize, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM, a CD recordable drive (CD-R drive), a CD rewriteable drive (CD-RW drive), a digital video ROM drive (DVD ROM), and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, SATA, Infiniband, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
   initializing a token statistics data structure, where the token statistics data structure is to store elements comprisinq a first entry to identify a token, and one or more of, a second entry to identify a sample period query frequency associated with the token, and a third entry to identify a fragmentation level associated with the token;
   updating the token statistics data structure with information related to a set of tokens associated with a set of queries processed during a sample period by a query processor;
   selecting a token to optimize based, at least in part, on information in the token statistics data structure, the token being selected based, at least in part, on determining that the value of a function based on both a sample period query frequency associated with a member of the set of tokens and a fragmentation level associated with the member of the set of tokens exceeds a desired level;
   estimating a fragmentation level of the database index based, at least in part, on the fragmentation level of one or more members of the set of tokens accessed most frequently during the sample period, where the database index includes one or more members of the set of tokens; and providing a signal concerning the token.

2. The method of claim 1, where updating the token statistics data structure includes one or more of, adding an element to the token statistics data structure, removing an element from the token statistics data structure, manipulating a sample period query frequency associated with a token, and manipulating a fragmentation level associated with a token.

3. The method of claim 1, where the token statistics data structure has a pre-determined, configurable number of elements, the number of elements being less than one thousand.

4. The method of claim 1, where a token is to be selected upon determining that a sample period query frequency associated with a member of the set of tokens exceeds a desired frequency level.

5. The method of claim 1, where a token is to be selected upon determining that a fragmentation level associated with a member of the set of tokens exceeds a desired fragmentation level.

6. The method of claim 5, including optimizing the token by de-fragmenting an index page associated with the token.

7. The method of claim 1, including selectively de-fragmenting a portion of the database index based, at least in part, on the fragmentation level of the index.

8. The method of claim 1, the sample period being one of, a user-configurable period of time, and a user-configurable number of queries.

9. The method of claim 1, the token statistics data structure being a list ordered by sample period query frequency.

10. The method of claim 1, including:
initializing a query statistics data structure;
updating the query statistics data structure with information related to the set of queries processed during the sample period;
selecting a member of the set of queries to optimize based, at least in part, on information in the query statistics data structure; and
selectively optimizing the member of the set of queries.

11. The method of claim 10, where the query statistics data structure is to store elements comprising an entry to identify a query and an entry to identify a query processing time associated with the query, and
where updating the query statistics data structure includes one or more of, adding an element to the query statistics data structure, removing an element from the query statistics data structure, and manipulating an entry identifying a query processing time associated with a query.

12. The method of claim 11, where the query statistics data structure has N elements, N being a pre-determined, configurable number of elements, N being less than three hundred.

13. The method of claim 12, the query statistics data structure being a list to store N queries having the longest query processing times observed during the sample period, the list being ordered by query processing time.

14. The method of claim 13, where a member of the set of queries is selected to be optimized upon determining that the member has one of the M longest query processing times, M being a number less than N.

15. The method of claim 14, including optimizing a query by de-fragmenting a portion of an index associated with a token in the query.

16. A method, comprising:
initializing a token statistics data structure that is to store elements comprising a first entry to identify a token, and one or more of, a second entry to identify a sample period query frequency associated with the token, and a third entry to identify a fragmentation level associated with the token, the token statistics data structure being a list ordered by sample period token frequency;
initializing a query statistics data structure that is to store elements comprising an entry to identify a query and an entry to identify a query processing time associated with the query, the query statistics data structure being an ordered list having N elements, N being a pre-determined, configurable number of elements, the query statistics data structure to store information concerning the N queries having the longest query processing times observed during the sample period, the list being ordered by query processing time;
updating the token statistics data structure with information related to a set of tokens associated with a set of queries processed during a sample period by a query processor;
updating the query statistics data structure with information related to the set of queries processed during the sample period;
optimizing a selected token upon determining that the value of a function based on both a sample period query frequency associated with a member of the set of tokens and a fragmentation level associated with the member exceeds a desired level, where optimizing the selected token includes de-fragmenting a memory page associated with the token;
estimating a fragmentation level of the database index based, at least in part, on the fragmentation level of one or more members of the set of tokens;
selectively de-fragmenting a portion of the database index based, at least in part, on the fragmentation level of the index; and
selectively optimizing a selected member of the set of queries by one or more of, de-fragmenting a portion of an index associated with a token in the selected query, and relocating data that satisfies the selected query, the selected member being one of the longest-running queries as determined by information appearing in the query statistics data structure.

17. A system, comprising:
a frequency logic to identify a set of tokens estimated to appear most frequently during a query sampling time period;
a fragmentation logic to estimate a token fragmentation associated with members of the set of tokens;
an identification logic to identify one or more tokens to optimize based, at least in part, on token access frequencies of members of the set of tokens and token fragmentation values of members of the set of tokens,
a token optimization logic to optimize a token by de-fragmenting a memory page associated with the token;
a query time logic to identify a set of queries estimated to consume the most processing time during the query sampling time period;
a query identification logic to identify one or more queries to optimize based, at least in part, on one or more of, query processing time, query frequency, and information concerning a token in a query,
a query optimization logic to optimize a member of the set of queries by one or more of, creating a materialized view from which the member can be satisfied, de-fragmenting one or more memory pages associated with satisfying the member, and optimizing a token associated with the member; and an index fragmentation logic to estimate a database index fragmentation level based, at least in part, on the estimated fragmentation level of one or more members of the set of tokens;

where the identification logic is to identify a portion of the database index to optimize based on a function of two variables, the two variables being token access frequency and token fragmentation, where the frequency logic and the fragmentation logic store token-related data in a data store, where the token-related data concerns tokens observed during the query sampling time period, where the data store is dynamically resizable during the query sampling time period, where the maximum size of the data store is less than one percent of the size of a database index associated with the set of tokens, and where the data store is ordered by one or more of, token access frequency, and token fragmentation.

* * * * *

UNITED STATES PATENT AND TRADEMARK OFFICE
CERTIFICATE OF CORRECTION

PATENT NO. : 7,849,113 B2
APPLICATION NO. : 11/978799
DATED : December 7, 2010
INVENTOR(S) : Sundeep Abraham et al.

Page 1 of 1

It is certified that error appears in the above-identified patent and that said Letters Patent is hereby corrected as shown below:

In column 12, line 50, in claim 1, delete "comprisinq" and insert -- comprising --, therefor.

Signed and Sealed this
Ninth Day of August, 2011

David J. Kappos
*Director of the United States Patent and Trademark Office*